United States Patent
Gu et al.

(10) Patent No.: US 10,964,061 B2
(45) Date of Patent: Mar. 30, 2021

(54) LEARNING-BASED CAMERA POSE ESTIMATION FROM IMAGES OF AN ENVIRONMENT

(71) Applicant: NVIDIA Corporation, Santa Clara, CA (US)

(72) Inventors: Jinwei Gu, San Jose, CA (US); Samarth Manoj Brahmbhatt, Decatur, GA (US); Kihwan Kim, Campbell, CA (US); Jan Kautz, Lexington, MA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/872,752

(22) Filed: May 12, 2020

(65) Prior Publication Data
US 2020/0273207 A1 Aug. 27, 2020

Related U.S. Application Data

(62) Division of application No. 16/137,064, filed on Sep. 20, 2018, now Pat. No. 10,692,244.
(Continued)

(51) Int. Cl.
*G06T 7/80* (2017.01)
*G06T 7/00* (2017.01)
(Continued)

(52) U.S. Cl.
CPC .............. *G06T 7/80* (2017.01); *G06K 9/00* (2013.01); *G06K 9/00986* (2013.01);
(Continued)

(58) Field of Classification Search
None
See application file for complete search history.

(56) References Cited

U.S. PATENT DOCUMENTS 9,715,642 B2 7/2017 Szegedy et al.
9,830,529 B2 11/2017 Jetley et al.
(Continued)

FOREIGN PATENT DOCUMENTS

WO WO 2017/134519 A1 8/2017
WO WO 2018/076212 A1 5/2018
(Continued)

OTHER PUBLICATIONS

Piewak, "Fully Convolutional Neural Networks for Dynamic Object Detection in Grid Maps," Master's Thesis of Florian Pierre Joseph Piewak, Dept. of Computer Science, Inst. for Anthropomatics and FZI Research Center for Information Technology, Dec. 13, 2015, 88 pp.
(Continued)

Primary Examiner — Dov Popovici
(74) Attorney, Agent, or Firm — Leydig, Voit & Mayer, Ltd.

(57) ABSTRACT

A deep neural network (DNN) system learns a map representation for estimating a camera position and orientation (pose). The DNN is trained to learn a map representation corresponding to the environment, defining positions and attributes of structures, trees, walls, vehicles, etc. The DNN system learns a map representation that is versatile and performs well for many different environments (indoor, outdoor, natural, synthetic, etc.). The DNN system receives images of an environment captured by a camera (observations) and outputs an estimated camera pose within the environment. The estimated camera pose is used to perform camera localization, i.e., recover the three-dimensional (3D) position and orientation of a moving camera, which is a fundamental task in computer vision with a wide variety of applications in robot navigation, car localization for autono-
(Continued)

mous driving, device localization for mobile navigation, and augmented/virtual reality.

18 Claims, 14 Drawing Sheets

Related U.S. Application Data

(60) Provisional application No. 62/569,299, filed on Oct. 6, 2017.

(51) Int. Cl.
*G06K 9/00* (2006.01)
*G06K 9/20* (2006.01)
*G06K 9/46* (2006.01)
*G06N 3/00* (2006.01)
*G06T 7/579* (2017.01)
*G06T 7/20* (2017.01)

(52) U.S. Cl.
CPC .......... *G06K 9/209* (2013.01); *G06K 9/4628* (2013.01); *G06N 3/00* (2013.01); *G06T 7/20* (2013.01); *G06T 7/579* (2017.01); *G06T 7/97* (2017.01); *G06T 2200/28* (2013.01); *G06T 2207/20081* (2013.01); *G06T 2207/20084* (2013.01); *G06T 2207/30244* (2013.01)

(56) References Cited

U.S. PATENT DOCUMENTS

| 10,019,654 | B1* | 7/2018 | Pisoni ............... G06N 3/084 |
| 2016/0379092 | A1* | 12/2016 | Kutliroff ........... G01C 21/3833 382/158 |
| 2017/0160747 | A1 | 6/2017 | Aghamohammadi et al. |
| 2017/0334066 | A1 | 11/2017 | Levine et al. |
| 2018/0189974 | A1 | 7/2018 | Clark et al. |
| 2018/0232632 | A1 | 8/2018 | Kaskari et al. |
| 2019/0043244 | A1 | 2/2019 | Ranftl |

FOREIGN PATENT DOCUMENTS

| WO | WO 2018/083667 A1 | 5/2018 |
| WO | WO 2018/083668 A1 | 5/2018 |
| WO | WO 2018/150901 A1 | 8/2018 |

OTHER PUBLICATIONS

Sanchez, "Adapting Deep Neural Networks to a Low-Power Environment," Master's Thesis of Oscar Manas Sanchez, Facultat d'Informatica de Barcelona Universitat Politecnica de Catalunya, 2017, 95 pp.
Henriques et al., "MapNet: An Allocentric Spatial Memory for Mapping Environments," The IEEE Conference on Computer Vision and Pattern Recognition (CVPR), 2018, p. 1-p. 9.
Toledo et al., "Improving Odeometric Accuracy for an Autonomous Electric Cart," Sensors, vol. 18, No. 1, Jan. 12, 2018, 15 pp.
U.S. Appl. No. 16/137,064, filed Sep. 20, 2018.

* cited by examiner

US 10,964,061 B2

LEARNING-BASED CAMERA POSE ESTIMATION FROM IMAGES OF AN ENVIRONMENT

CLAIM OF PRIORITY

This application is a continuation of U.S. application Ser. No. 16/137,064 titled "LEARNING-BASED CAMERA POSE ESTIMATION FROM IMAGES OF AN ENVIRONMENT," filed Sep. 20, 2018 which claims the benefit of U.S. Provisional Application No. 62/569,299 titled "Learning an Optimal Map Representation for Camera Tracking," filed Oct. 6, 2017, the entire contents of these applications are incorporated herein by reference.

FIELD OF THE INVENTION

The present invention relates to determining a camera pose, and in particular, to determining the camera pose using a neural network.

BACKGROUND

Camera localization, i.e., recovering the three-dimensional (3D) position and orientation of a moving camera is one of the fundamental tasks in computer vision with a wide variety of applications in robot navigation, car localization for autonomous driving, device localization for mobile navigation, and augmented/virtual reality. A key component in camera localization is the concept of a map. A map is an abstract summary of the input data that establishes geometric constraints between observations and can be used to establish correspondences between consecutive image frames. A map can be queried to obtain the camera pose for correcting drift in relative pose estimation and reinitialize the camera pose if the tracking is lost. Maps, however, are usually defined in an application-specific manner with hand-crafted features. Examples include 3D landmarks, 3D points, line/edge structures for indoor/man-made scenes, groups of pixels with depth, or object-level context for semantic techniques. Being application-specific, the map representations may ignore useful (sometimes, the only available) features in environments and thus may not be optimal or robust for general scenarios. There is a need for addressing these issues and/or other issues associated with the prior art.

SUMMARY

A deep neural network (DNN) system learns a map representation for camera localization. The DNN system receives images of an environment captured by a camera (observations) and outputs a camera pose (position and orientation) within the environment. The DNN is trained to determine a map representation corresponding to the environment, defining positions and attributes of structures, trees, walls, vehicles, etc. Examples of conventional map representation types include three-dimensional (3D) points, line/edge structures for indoor/man-made scenes, and groups of pixels with depth. Typically, one type of map representation is used that is best-suited for the particular environment. In contrast, the DNN system learns a map representation that is versatile and performs well for many different environments (indoor, outdoor, natural, synthetic, etc.). The map representation may be learned by the DNN and updated using supervised training and/or self-supervised training. Additionally, the DNN may be trained by fusing additional multi-sensory inputs with the camera poses estimated by the DNN to improve accuracy of the DNN.

A method, computer readable medium, and system are disclosed for estimating a camera pose. Weights of a DNN are determined during training using a labeled training dataset including images and corresponding absolute camera poses and relative camera poses, where the weights define a map representation of an environment. An input image is received at the DNN. The DNN applies the weights to the input image to generate an estimated camera pose for capturing the environment to produce the input image.

DETAILED DESCRIPTION

During inferencing, a DNN system receives a sequence of images and generates a sequence of camera poses using weights. The DNN system learns a map representation of an environment for camera localization. In the context of the following description, camera localization comprises determining a camera pose that includes a position and orientation. The map representation corresponds to the environment, defining positions and attributes of structures, trees, walls, vehicles, etc. Examples of conventional map representation types include three-dimensional (3D) points, line/edge structures for indoor/man-made scenes, and groups of pixels with depth. Typically, one type of map representation is used that is best-suited for the particular environment. In contrast with conventional camera localization systems, the DNN system learns a map representation that is versatile and performs well for many different environments (indoor, outdoor, natural, synthetic, etc.). The DNN system receives images of an environment captured by a camera (observations) and outputs a camera pose within the environment. The DNN system is initially trained using labelled training data.

Figure 1A:
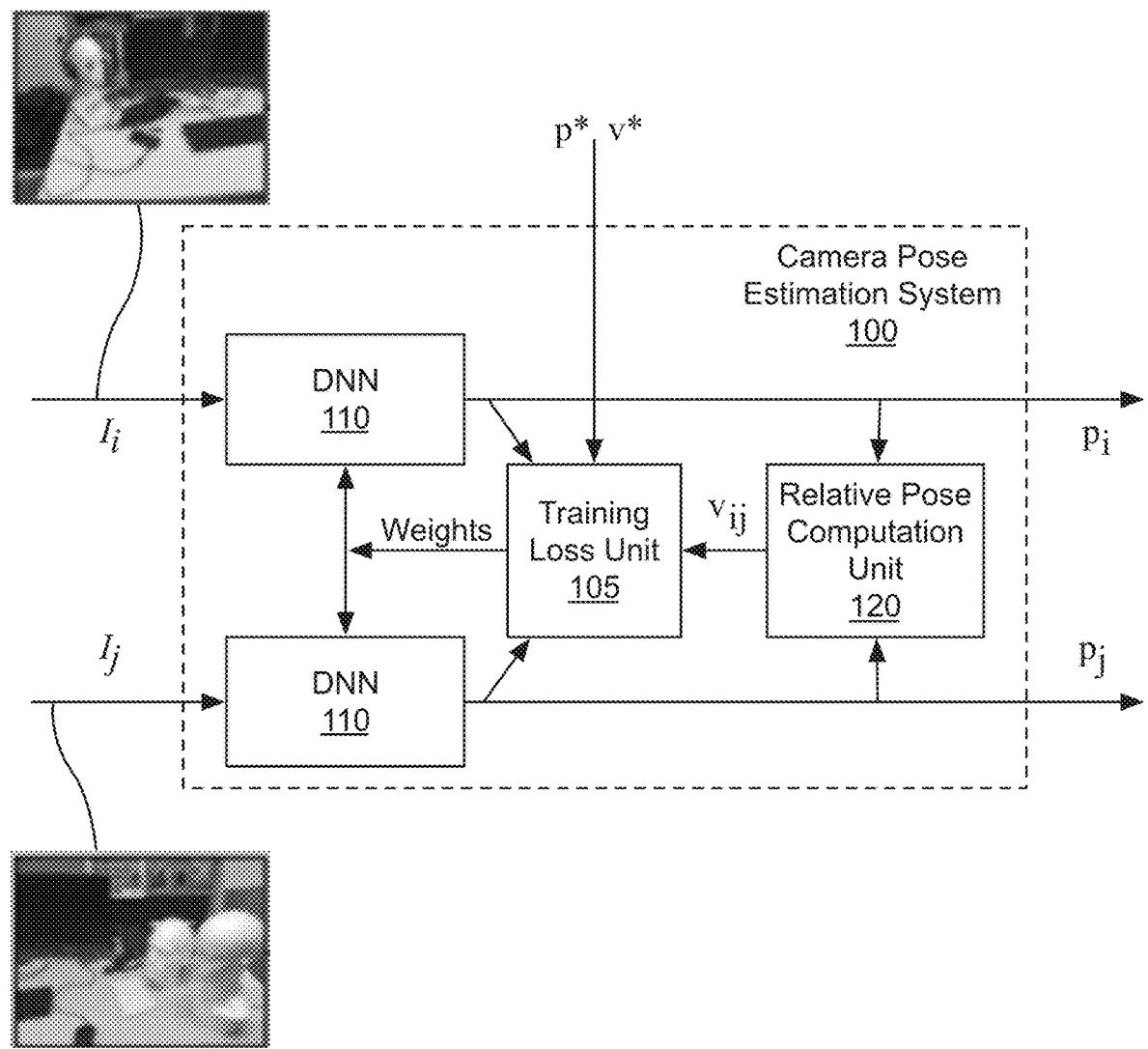
FIG. 1A illustrates a block diagram of a camera pose estimation system, in accordance with an embodiment.

FIG. 1A illustrates a block diagram of a camera pose estimation system 100, in accordance with an embodiment. Although the camera pose estimation system 100 is described in the context of a DNN model, the camera pose estimation system 100 may also be implemented by a program, custom circuitry, or by a combination of custom circuitry and a program. For example, the camera pose estimation system 100 may be implemented using a GPU (graphics processing unit), CPU (central processing unit), or any processor capable of performing the operations described herein. Furthermore, persons of ordinary skill in the art will understand that any system that performs the operations of the camera pose estimation system 100 is within the scope and spirit of embodiments of the present invention.

As shown in FIG. 1A, the camera pose estimation system 100 includes a pair of DNNs 110, a training loss unit 105, and a relative pose computation unit 120. In an embodiment, the DNN 110 is a deep convolutional neural network (CNN). In an embodiment, the DNN 110 comprises at least a convolutional neural network layer, followed by a global average pooling layer, followed by a fully-connected layer to output the estimated camera pose. The camera pose estimation system 100 is trained to learn a map representation for a particular environment. Importantly, the camera pose estimation system 100 is versatile and may be trained to learn different types of map representations. During supervised and/or self-supervised training, parameters (weights Θ) of the DNNs 110 are updated.

Each DNN 110 receives an image (e.g., pixel values) and generates an estimated camera pose based on the weights. The DNNs 110 are trained to learn the map representation that is defined by the weights and used by the DNNs 110 to process an input image pair of the images $I_i$ and $I_j$ and produce corresponding estimated camera pose pairs $p_i$ and $p_j$. The input images may by captured from two different poses in the environment. For example, the input images may correspond to a path through the environment and be one after the other in sequence. In another example, the input images may be from two different points along the path that are separated by any distance. In other words, zero, one, two, or any number of intervening images may occur between the input images $I_i$ and $I_j$ along the path through the environment.

The relative pose computation unit 120 computes a relative estimated camera pose $v_{ij}$ using the estimated camera pose pair. The training loss unit 105 receives the estimated pose pair, relative estimated camera pose, a ground truth (absolute) camera pose p* corresponding to one of the input images, and a ground truth relative pose v* corresponding to the input images. In an embodiment, the ground truth relative pose v* is computed from the input images included in a training dataset that includes at least the input images, where each input image is paired with a ground truth camera pose. The training loss unit 105 computes a loss function and updates the weights used by the DNNs 110. In an embodiment, the weights are modified to simultaneously reduce differences between the relative estimated camera poses and the ground truth relative camera poses and differences between the estimated camera poses generated by the DNN 110 and the ground truth camera poses.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1B:
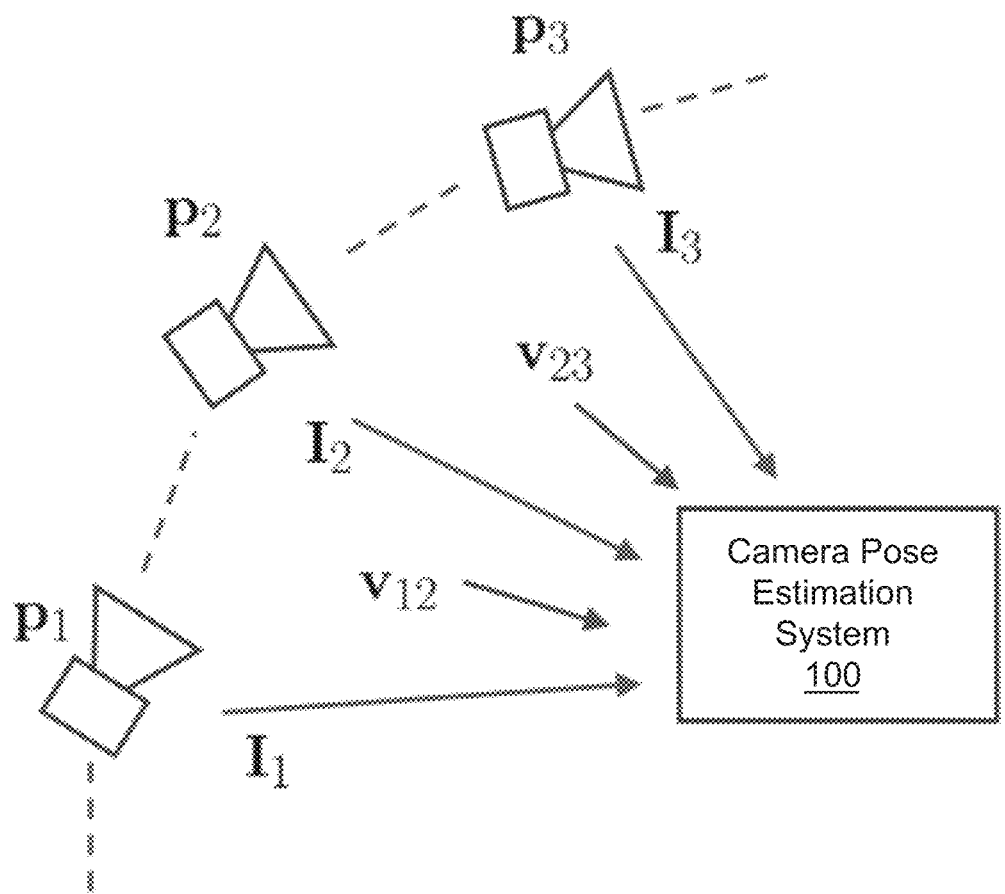
FIG. 1B illustrates a conceptual diagram of the camera poses and inputs to the camera pose estimation system, in accordance with an embodiment.

FIG. 1B illustrates a conceptual diagram of the camera poses and inputs to the camera pose estimation system, in accordance with an embodiment. Ground truth camera poses $p_1$, $p_2$, and $p_3$ are each associated with a ground truth input image $I_1$ $I_2$, and $I_3$). The ground truth input image corresponding to a ground truth camera pose is the image of the environment that is captured by a camera configured (in position and orientation) within the environment according to the ground truth camera pose. The ground truth camera poses $p_1$ and $p_2$ are each associated with a ground truth relative camera pose $v_{12}$ and $v_{23}$.

The ground truth input images are input to the camera pose estimation system 100 to generate estimated camera poses and estimated relative camera poses. The training loss unit 105 receives the estimated camera poses, estimated relative camera poses, the ground truth camera poses, and the ground truth relative camera poses and generates updated weights according to a loss function. When a desired accuracy level is achieved by the camera pose estimation system 100, supervised training of the camera pose estimate system 100 is complete and the environment map is defined by the weights. The accuracy level is indicated by differences between the estimated camera poses and the ground truth camera poses and differences between the estimated relative camera poses and the ground truth relative camera poses.

Importantly, the environment map is learned in a data-driven manner. Therefore, a variety of different environments, each having an associated training dataset, may be learned by camera pose estimation system 100. Following supervised training, the camera pose estimate system 100 may be deployed to generate estimated camera poses based on input images received in real time from a camera or images from another source. In an embodiment, after supervised training is completed, the relative pose computation unit 120 and the training loss unit 105 are idle and may be removed or reconfigured.

In an embodiment, the camera pose estimation system 100 includes only a single DNN 110, and a single estimated camera pose is generated for each input image. In such an embodiment, the single estimated camera pose is stored within the camera pose estimate system 100 and used by the relative pose computation unit 120 and the training loss unit 105 to update the weights.

Figure 1C:
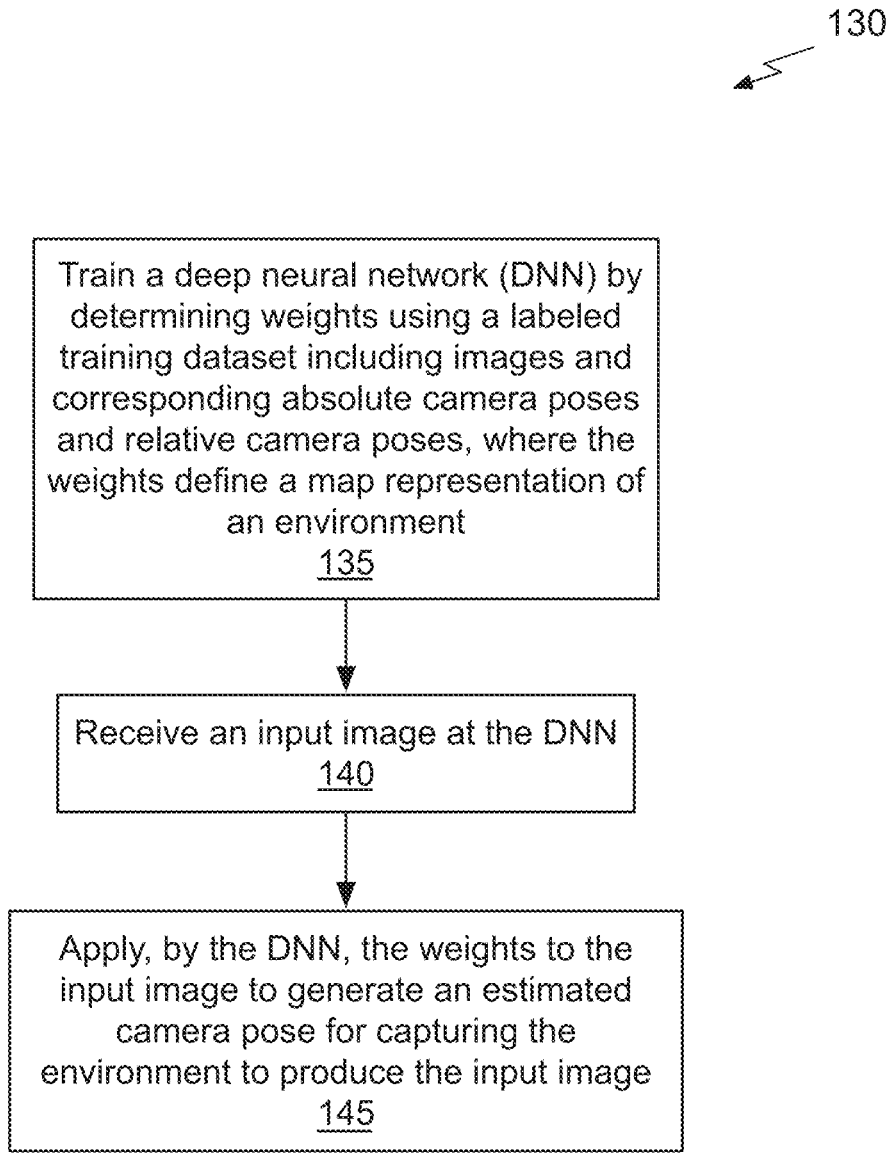
FIG. 1C illustrates a flowchart of a method for estimating camera pose, in accordance with an embodiment.

FIG. 1C illustrates a flowchart of a method 130 for estimating camera pose, in accordance with an embodiment. Although method 130 is described in the context of the camera pose estimation system 100, the method 130 may also be performed by a program, custom circuitry, or by a combination of custom circuitry and a program. For example, the method 130 may be executed by a GPU (graphics processing unit), CPU (central processing unit), or any processor capable of performing the camera pose estimation operations. Furthermore, persons of ordinary skill in the art will understand that any system that performs method 130 is within the scope and spirit of the present invention.

At step 135, the DNN 110 is trained by determining weights using a labeled training dataset including images and corresponding absolute camera poses and relative camera poses, where weights of the DNN 110 define a map representation of an environment. At step 140, an input image is received at the DNN 110. At step 145, the DNN 110 applies the weights to the input image to generate an estimated camera pose for capturing the environment to produce the input image.

Conventional camera localization systems train a neural network using single images labelled with absolute camera poses. In contrast, the camera pose estimation system 100 is trained using geometric constraints between pairs of observations that are included as an additional loss term to update the weights. In an embodiment, the geometric constraints are provided by the relative estimated camera pose $v_{ij}$. Thus, the training is a geometry-aware learning technique that can significantly improve camera localization performance.

The DNN 110 is trained to estimate a camera pose from an input RGB image I on the training set $\mathcal{D} = \{(I, p^*)\}$ via supervised learning, $f(I, \Theta) = p$, where camera pose $p = (t, w)$, t is a position, e.g., (x,y,z) coordinates and w is an orientation (direction). The main difference between the training of DNN 110 for estimating camera poses and other training techniques, is that the loss of the per-image absolute pose and the loss of the relative pose between image pairs are simultaneously minimized. In an embodiment, the following loss function is used to simultaneously reduce differences between the relative estimated camera poses and the ground truth relative camera poses and differences between the estimated camera poses generated by the DNN 110 and the ground truth camera poses.

$$L_{\mathcal{D}}(\Theta) = \sum_{i=1}^{|\mathcal{D}|} h(p_i, p^*_i) + \alpha \sum_{i,j=1, i \neq j}^{|\mathcal{D}|} h(v_{ij}, v^*_{ij}), \quad (1)$$

where $v_{ij} = (t_i - t_j, w_i - w_j)$ is the relative camera pose between pose predictions $p_i$ and $p_j$ for images $I_i$ and $I_j$. $h(\cdot)$ is a function to measure the distance between the predicted camera pose p and the ground truth camera pose p*, defined as:

$$h(p_i, p^*) = \|t - t^*\|_1 e^{-\beta} + \beta + \|w - w^*\|_1 e^{-\gamma} + \gamma, \quad (2)$$

where $\beta$ and $\gamma$ are weights that balance a translation loss and a rotation loss. $\beta$ and $\gamma$ are initialized as $\beta_0$ and $\gamma_0$ and both are learned during training. $(I_i, I_j)$ are image pairs within each tuple of s images sampled with a gap of k frames from $\mathcal{D}$. Intuitively, adding the loss contribution of the relative camera poses between image pairs helps to enforce global consistency, which improves the performance of camera localization. In an embodiment, the weight coefficient $\alpha = 1$, $\beta_0 = 0.0$, and $\gamma_0 = -3.0$. In an embodiment, image pairs are sampled from tuples of size s=3 with spacing k=10 frames.

In an embodiment, the camera orientation is parameterized as the logarithm of a unit quaternion to represent rotation, and is better suited for regression of a DNN. Conventional techniques use 4-d unit quaternions to represent and regress the camera orientation with a $l_1$ or $l_2$ norm loss function. Issues with using 4-d unit quaternions are (1) the quadruple is an over parameterization of the 3 degree of freedom (DoF) rotation and (2) normalization of the output quadruple is required, but often results in worse performance. Conventional techniques may also use Euler angles which are not over-parameterized. However, Euler angles are not suited for regression since they wrap around $2\pi$.

The logarithm of a unit quaternion, log q has 3 dimensions and is not over-parameterized. Therefore, the $l_1$ or $l_2$ distance is directly used as the loss function without normalization. The logarithm of a unit quaternion q=(u, v), where u is a scalar and v is a 3-d vector is defined as:

$$\log q = \begin{cases} \frac{v}{\|v\|} \cos^{-1} u, & \text{if } \|v\| \neq 0 \\ 0, & \text{otherwise} \end{cases} \quad (3)$$

The logarithmic form w=log q can be converted back to a unit quaternion by formula exp $$w = \left(\cos \|w\|, \frac{w}{\|w\|} \sin \|w\|\right).$$

Using the logarithmic rotation parameterization achieves better results than conventional techniques, in terms of estimated camera pose accuracy.

Conventional camera localization systems are offline techniques requiring supervised training, fixing values of parameters used by the neural network after training is completed. In contrast, the camera pose estimation system 100 may be modified to use geometric constraints between pairs of observations to continuously update the weights (i.e., defined map representation) used by the DNNs 110. While supervised training may be performed using a labelled training dataset that includes ground truth camera poses and ground truth relative camera poses, self-supervised training may be performed, without requiring ground truth data, as additional unlabeled images are received. The unlabeled images may be received during inferencing when the camera pose estimation system 100 is deployed. For example, the unlabeled images may include videos captured at different times or camera motions in the environment.

Figure 1D:
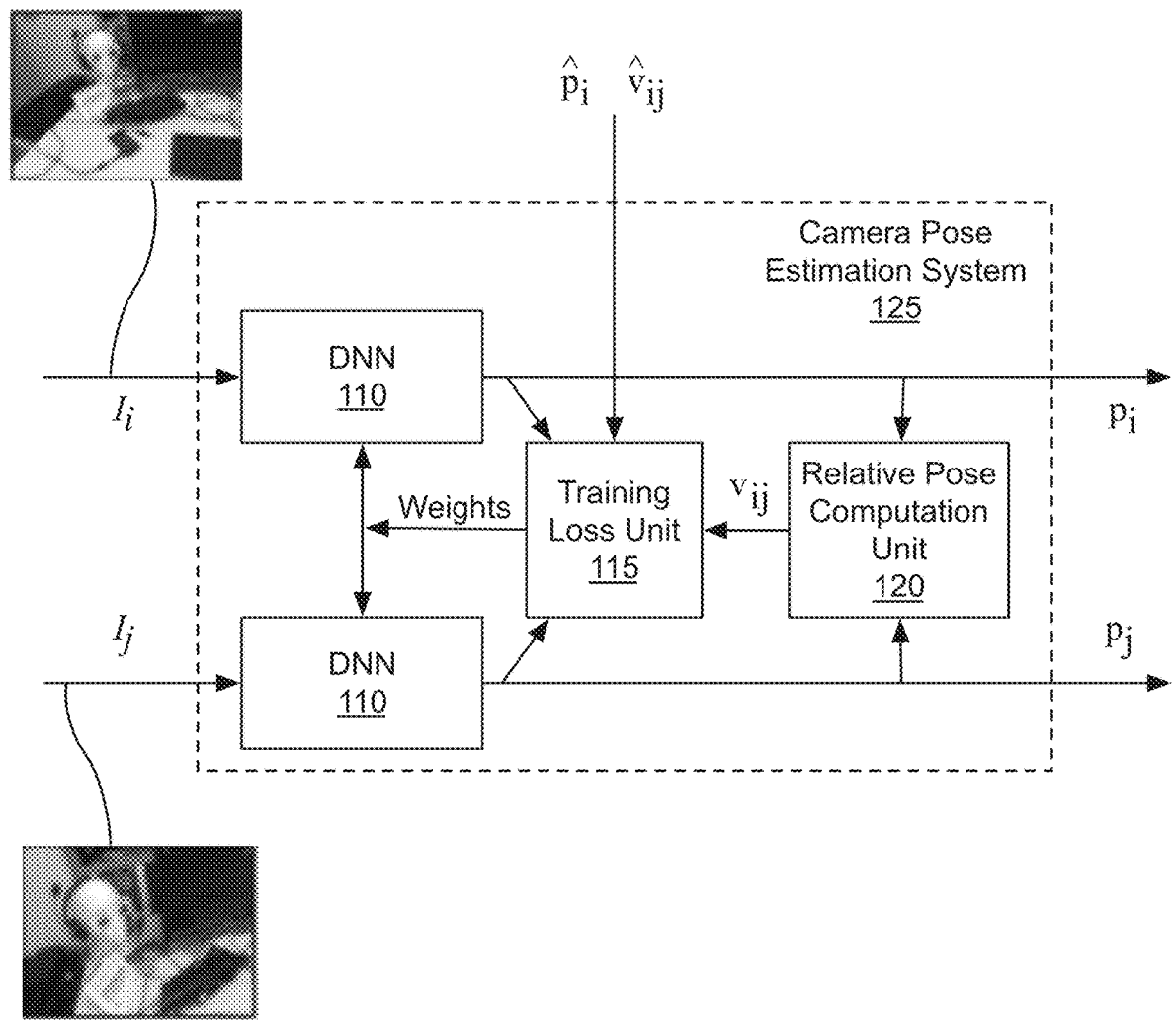
FIG. 1D illustrates a block diagram of another camera pose estimation system, in accordance with an embodiment.

FIG. 1D illustrates a block diagram of another camera pose estimation system 125, in accordance with an embodiment. Although the camera pose estimation system 125 is described in the context of a DNN model, the camera pose estimation system 125 may also be implemented by a program, custom circuitry, or by a combination of custom circuitry and a program. For example, the camera pose estimation system 125 may be implemented using a GPU (graphics processing unit), CPU (central processing unit), or any processor capable of performing the operations described herein. Furthermore, persons of ordinary skill in the art will understand that any system that performs the operations of the camera pose estimation system 125 is within the scope and spirit of embodiments of the present invention.

As shown in FIG. 1D, the camera pose estimation system 125 includes the pair of DNNs 110, a training loss unit 115, and the relative pose computation unit 120. The camera pose estimation system 125 learns a map representation for a particular environment through supervised and/or self-supervised training. During supervised and/or self-supervised training, parameters (weights $\Theta$) of the DNNs 110 are updated. In an embodiment, the training loss unit 115 may be configured to perform the operations of the training loss unit 105, enabling supervised learning and self-supervised learning. In another embodiment, the training loss unit 105 is also included within the camera pose estimation system 125.

In contrast with the camera pose estimation system 100, the training loss unit 115 receives geometric constraints in the form of sensor data. The geometric constraints can come from a variety of sources: pose constraint from visual odometry (VO) between pairs of images, translation constraint from two global position sensor (GPS) readings (providing relative 3D position measurements), rotation constraint from two inertial measurement unit (IMU) readings (providing relative rotation measurements), and the like. Furthermore, IMU and GPS provide measurements about camera pose that are especially useful for challenging conditions (e.g., textureless, low-light). As shown in FIG. 1D, the inputs $\hat{p}_i$ and $\hat{v}_{ij}$ are GPS and visual odometry measurements, respectively. In the context of the following description, the data received during simultaneous inferencing and self-supervised training (in addition to the input images) is additional data $\mathcal{T}$.

The training loss unit 115 receives the estimated pose pair, relative estimated camera pose $v_{ij}$ from the relative pose computation unit 120, and the additional data $\mathcal{T}$ including $\hat{p}_i$ and $\hat{v}_{ij}$. The training loss unit 115 computes a loss function and updates the weights used by the DNNs 110. In an embodiment, the weights are modified to simultaneously reduce differences between the relative estimated camera poses and $\hat{v}_{ij}$ and differences between the estimated camera poses generated by the DNN 110 and $\hat{p}_i$.

Suppose the additional data are some videos of the same scene, $\mathcal{T} = \{I_t\}$. Additional relative camera poses $\hat{v}_{ij}$ may be computed between consecutive frames ($I_t$ and $I_{t-1}$) in one of the videos using conventional visual odometry algorithms. In order to update the defined map representation with $\mathcal{T}$, weights $\Theta$ of the camera pose estimation system 125 are fine-tuned by minimizing a loss function that consists of the original loss from the labelled dataset $\mathcal{D}$ and the loss from the unlabeled data $\mathcal{T}$, $$L(\Theta) = L_\mathcal{D}(\Theta) + L_\mathcal{T}(\Theta), \quad (4)$$

where $L_\mathcal{T}(\Theta)$ is the distance between the relative camera pose $v_{ij}$ (from predictions $p_i$, $p_j$) and the additional data, relative camera poses $\hat{v}_{ij}$, and $$L_\mathcal{T}(\Theta) = \sum_{i,j=1, i \neq j}^{|\mathcal{T}|} h(v_{ij}, \hat{v}_{ij}) \quad (5)$$

Since visual odometry algorithms compute $\hat{v}_{ij}$ in the coordinate system of camera i, the relative estimated camera pose $v_{ij}$ is also computed in the coordinate system of camera i:

$$v_{ij} = (\exp(w_j)(t_i - t_j)\exp(w_j)^-,$$

$$\log(\exp(w_j)^{-1} \exp(w_i))). \quad (6)$$

Importantly, the supervision loss $L_\mathcal{D}(\Theta)$ from the labelled dataset $\mathcal{D}$ is included in the loss function of equation (4) to avoid trivial solutions resulting from optimizing only the self-supervised loss $L_\mathcal{T}(\Theta)$ from $\mathcal{T}$. In an embodiment, for supervised and self-supervised training, mini-batches of training data sample a portion from the labelled data $\mathcal{D}$ and the remainder from the unlabeled data $\mathcal{T}$. The image pairs $I_i$, $I_j$ are sampled similarly from tuples of s images with a gap of k frames from both $\mathcal{D}$ and $\mathcal{T}$. More specifically, suppose there are N images in an input sequence, $I_1, \ldots, I_N$. Within each tuple of s images, each two neighboring elements will form an image pair for training. For example, both ($I_i, I_{i+k}$) and ($I_{i+k(s-2)}, I_{i+k(s-1)}$) are valid image pairs.

The camera pose estimation system 125 exploits the complementary characteristics of visual odometry and DNN-based camera pose prediction—the visual odometry is locally accurate but often drifts over time, and DNN-based camera pose predictions are noisy but drift-free. For other sensors such as IMU (which measures relative rotation) and GPS (which measures 3D locations), similar loss terms $L_\mathcal{T}(\Theta)$ may be defined and computed by the training loss unit 115 to minimize the difference between such measurements and the estimates (predictions) generated by the DNN 110.

Figure 1E:
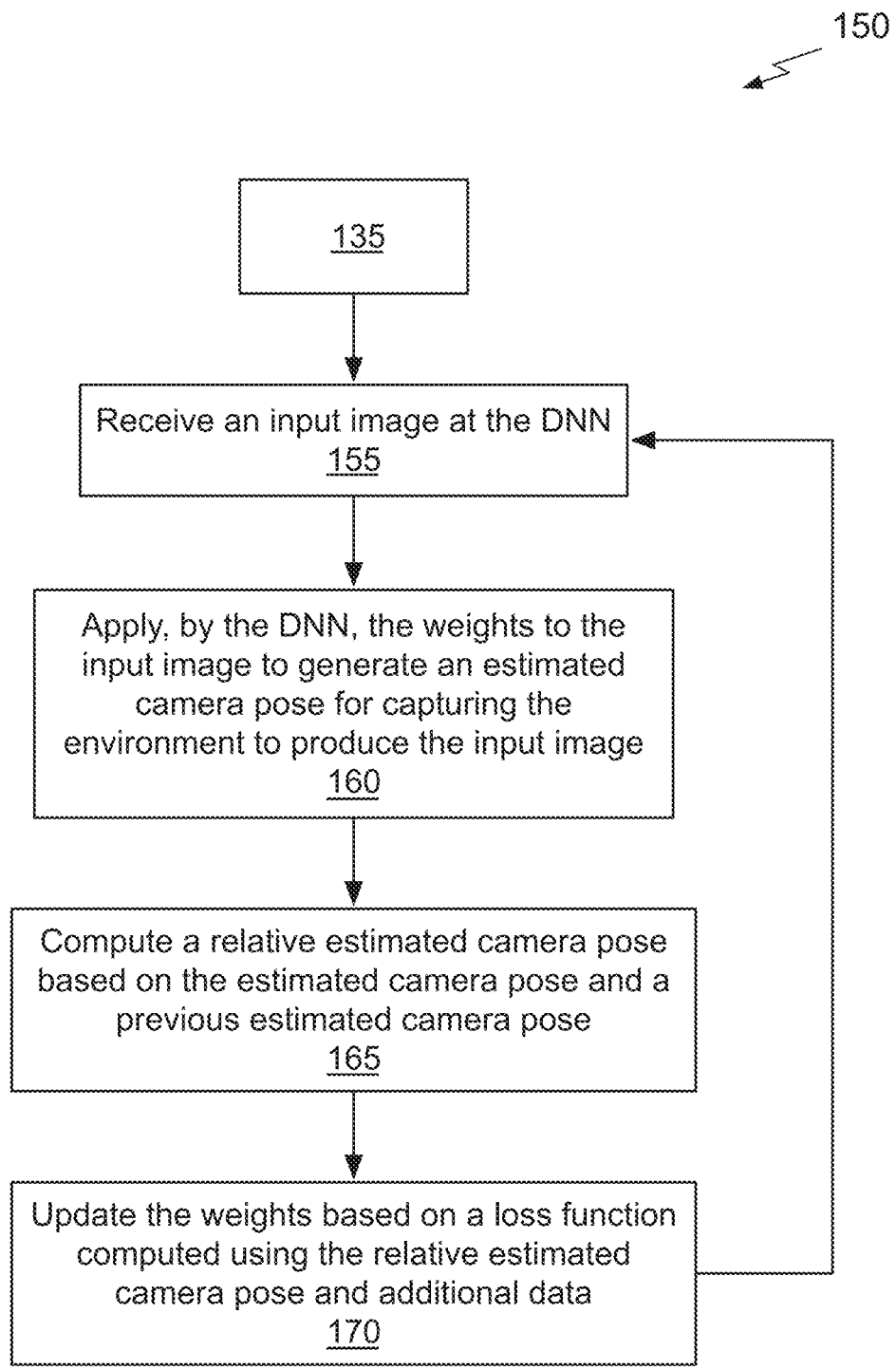
FIG. 1E illustrates a flowchart of another method for estimating camera pose, in accordance with an embodiment.

FIG. 1E illustrates a flowchart of another method 150 for estimating camera pose, in accordance with an embodiment. Although method 150 is described in the context of the camera pose estimation system 125, the method 150 may also be performed by a program, custom circuitry, or by a combination of custom circuitry and a program. For example, the method 150 may be executed by a GPU (graphics processing unit), CPU (central processing unit), or any processor capable of performing the camera pose estimation operations. Furthermore, persons of ordinary skill in the art will understand that any system that performs method 150 is within the scope and spirit of embodiments of the present invention.

Step 135 is completed, as previously described in conjunction with FIG. 1C, to train the DNN 110 using a labeled training dataset including images and corresponding absolute camera poses and relative camera poses. At step 155, an input image is received at the DNN 110. Unlike the input images received during supervised training, the input image received at the DNN 110 is not labelled and is therefore associated with a ground truth absolute camera pose and a ground truth relative camera pose. At step 160, the DNN 110 applies the weights to the input image to generate an estimated camera pose for capturing the environment to produce the input image. In an embodiment, a rotation portion of the estimated camera pose is parameterized as a 3D logarithm of a unit quaternion.

At step 165, a relative estimated camera pose is computed by the relative pose computation unit 120. At step 170, the training loss unit 115 updates the weights based on a loss function computed using the relative estimated camera pose and additional data. In an embodiment, the additional data includes visual odometry data corresponding to the input image and the weights of the DNN 110 are updated to minimize differences between a relative camera pose computed using the visual odometry data and the relative estimated camera pose. In an embodiment, the additional data includes GPS data corresponding to the input image and the weights of the DNN 110 are updated to minimize differences between the GPS data and the estimated camera pose. In an embodiment, the additional data includes inertial measurement data corresponding to the input image and the weights of the DNN 110 are updated to minimize differences between the inertial measurement data and the estimated camera pose.

Figure 2A:
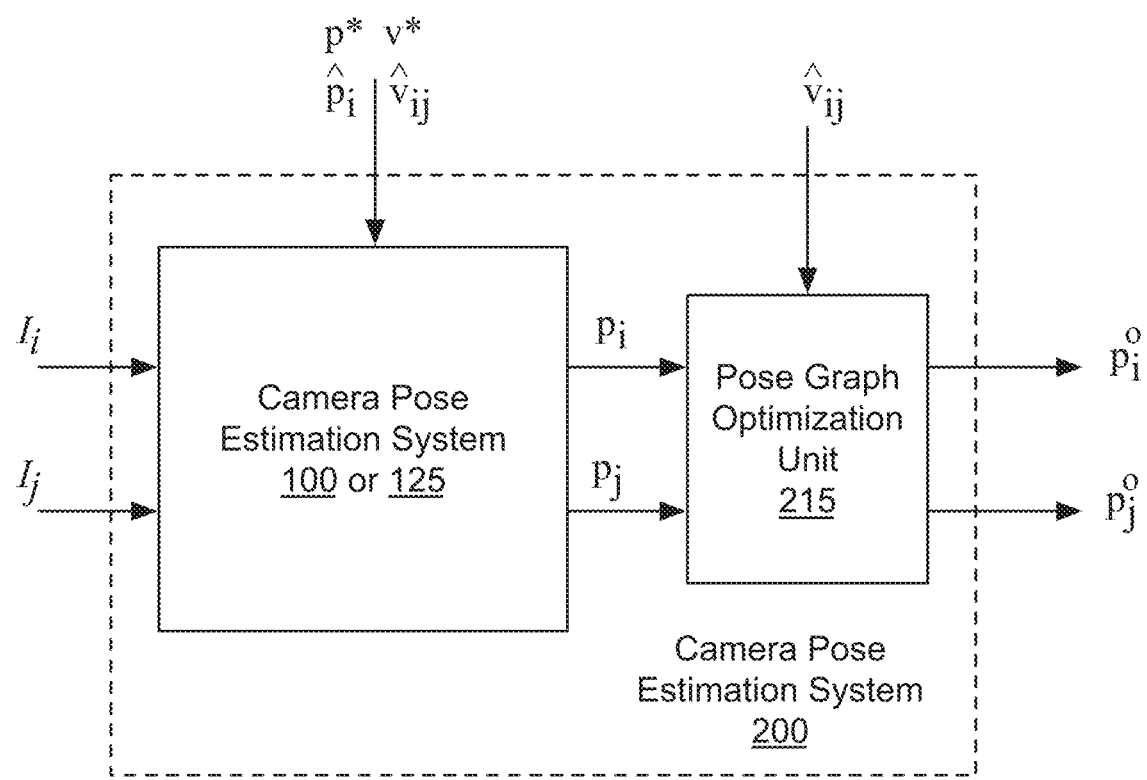
FIG. 2A illustrates a block diagram of another camera pose estimation system, in accordance with an embodiment.

FIG. 2A illustrates a block diagram of another camera pose estimation system 200, in accordance with an embodiment. The camera pose estimation system 200 includes the camera pose estimation system 100 or 125 or a combination of the camera pose estimation system 100 or 125. In additional, a pose graph optimization unit 215 refines the estimated camera poses.

The purpose of pose graph optimization (PGO) is to refine the input camera poses such that the refined camera poses are close to the input camera poses (from the camera pose estimation system 100 or 125), and the relative transforms between the refined camera poses agree with the input relative camera poses $\hat{v}_{ij}$. PGO is an iterative optimization process. During inferencing, the pose graph optimization unit 215 fuses the estimated camera pose from the camera pose estimation system 100 or 125 and the relative camera poses $\hat{v}_{ij}$ from visual odometry to produce smooth and globally consistent camera pose predictions $p_i^o$ and $p_j^o$. Moreover, at runtime (i.e., during inferencing), the complementary noise characteristics of the estimated camera poses (locally noisy but drift-free) and visual odometry (locally smooth but drifty) are exploited by fusing using a moving window technique with PGO.

A moving-window of T frames is used the initial poses predicted by camera pose estimation system 100 or 125 are $\{p_i\}_{i=1}^T$, and the relative poses between two frames from visual odometry are $\{\hat{v}_{ij}\}$ where i,j∈[1, T], i≠j. Combining the camera pose estimation system 100 or 125 with the pose graph optimization unit 215 solves for the optimal camera poses $\{p_i^o\}_{i=1}^T$ by minimizing the following loss function (cost):

$$L_{PGO}(\{p_i^o\}_{i=1}^T) = \Sigma_{i=1}{}^T \bar{h}(p_i^o, p_i) + \Sigma_{i,j=1, i \neq j}{}^T \bar{h}(v_{ij}^o, \hat{v}_{ij}), \quad (7)$$

where $\bar{h}(\cdot)$ is a pose distance function shown as Equation (10) below. PGO is an iterative algorithm where internally $v_{ij}^o$ is derived from $p_i^o$ and $p_j^o$ as in Equation (6). Note, the DNN 110 weights Θ are fixed and only $\{p_i^o\}_{i=1}^T$ is optimized. Combining the camera pose estimation system 100 or 125 with the pose graph optimization unit 215 further improves the accuracy of the estimated camera poses, with a minimal extra computational cost at testing.

The estimated camera poses $\{p_i\}_{i=1}^T$ and the relative camera poses from visual odometry $\{\hat{v}_{ij}\}$ are 6-dimensional (3d translation t+3d log quaternion w). For the remainder of the PGO algorithm description, the log quaternions are converted to unit quaternion using the exponential map:

$$q = \left(\cos \|w\|, \frac{w}{\|w\|} \sin \|w\|\right). \quad (8)$$

A state vector z is the concatenation of all T camera pose vectors. The total objective function is the sum of the costs of all constraints. The constraints can be either for the absolute pose or for the relative pose between a pair of poses. For both of these categories, there are separate constraints for translation and rotation:

$$E(z) = \sum_c E_c(z) \quad (9)$$
$$= \Sigma_c \bar{h}(f_c(c), k_c)$$

where $\bar{h}$ is the pose distance function from Equation (7) and $f_c$ is a function that maps the state vector to the quantity relevant for the constraint c. For example, $f_c$ selects $p_i$ from the state vector for a constraint on the absolute camera pose, or computes the visual odometry between camera poses for $p_i$, and $p_j$ for a constraint on the relative camera pose. $k_c$ is the observation for the constraint on the relative camera pose, and remains constant throughout the optimization process. For example, (1) For the absolute camera pose constraints, $k_c$ is the estimated camera pose produced by the camera pose estimation system 125 and (2) For the relative camera pose constraints, $k_c$ is the additional data input $\hat{v}_{ij}$. The pose distance function $\bar{h}$ is defined as:

$$\bar{h}(f_c(c), k_c) = (f_c(z) - k_c)^T S_c (f_c(z) - k_c) \quad (10)$$

where $S_c$ is the covariance matrix for the constraint. In an embodiment, $S_c$ is set to identity for all translation constraints and tuned to σ/3(σ=10 to 35) for different environments.

Figure 2B:
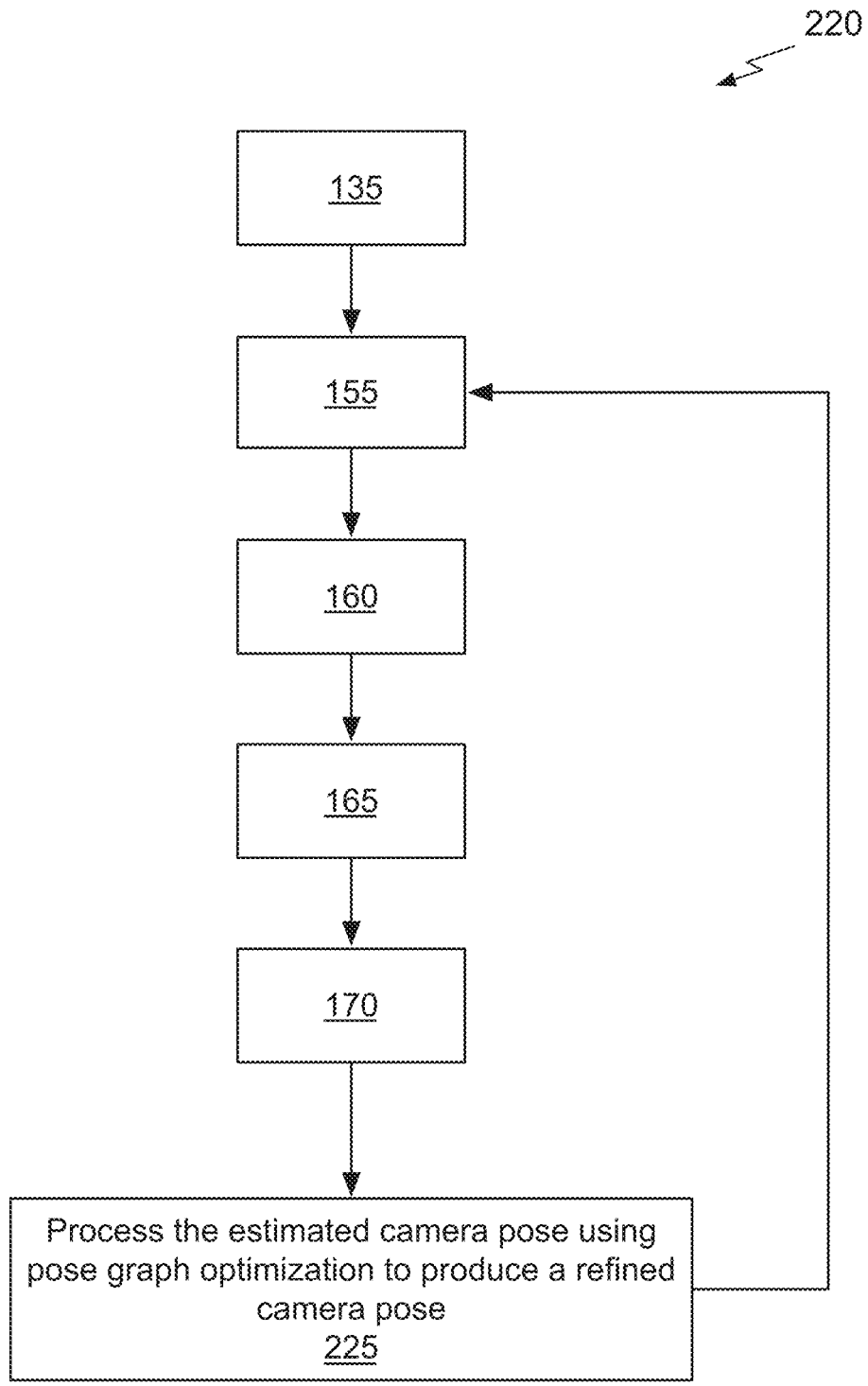
FIG. 2B illustrates a flowchart of a method for estimating camera pose using the camera pose estimation system shown in FIG. 2A, in accordance with an embodiment.

FIG. 2B illustrates a flowchart of a method 220 for estimating camera pose using the camera pose estimation system shown in FIG. 2A, in accordance with an embodiment. Steps 135, 155, 160, 165, and 170 are completed as previously described in conjunction with FIG. 1E and FIG. 1C. At step 225, the estimated camera pose generated by the camera pose estimation system 100 or 125 is processed by the pose graph optimization unit 215 using PGO to produce the refined camera pose. In an embodiment, the pose graph optimization unit 215 processes pairs of estimated camera poses to produce pairs of refined camera poses.

Figure 2C:
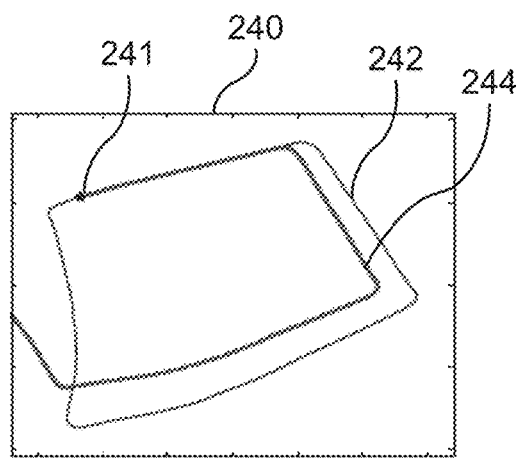
FIG. 2C illustrates camera localization results, in accordance with an embodiment.
Figure 2C:
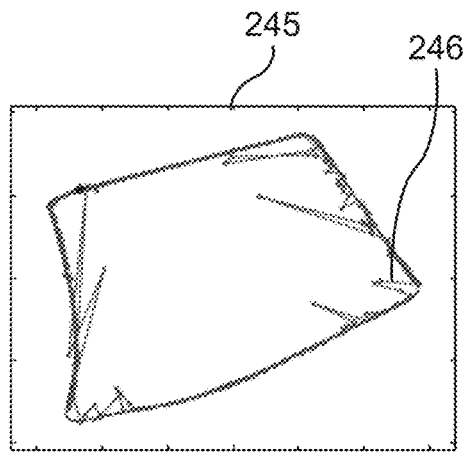
Figure 2C:
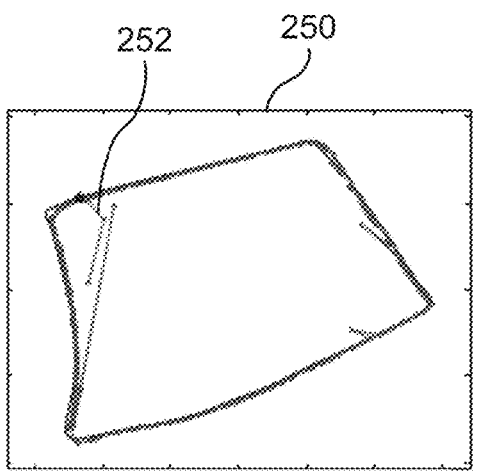
Figure 2C:
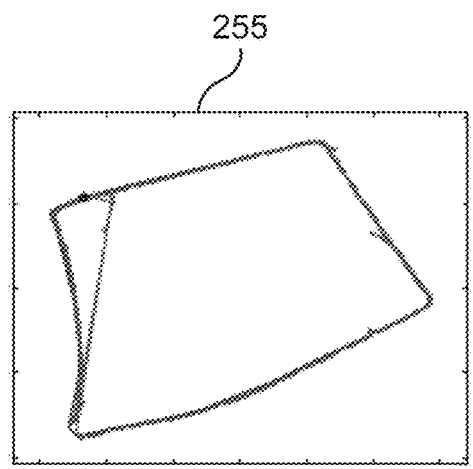
Figure 2C:
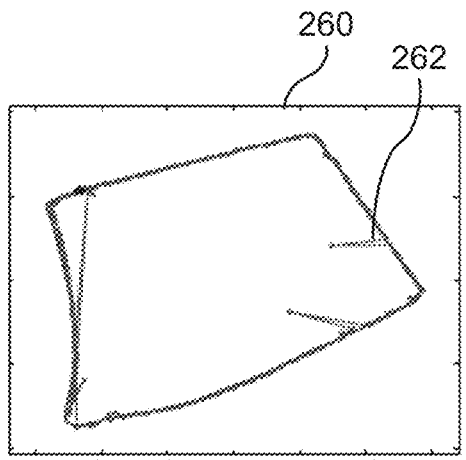
Figure 2C:
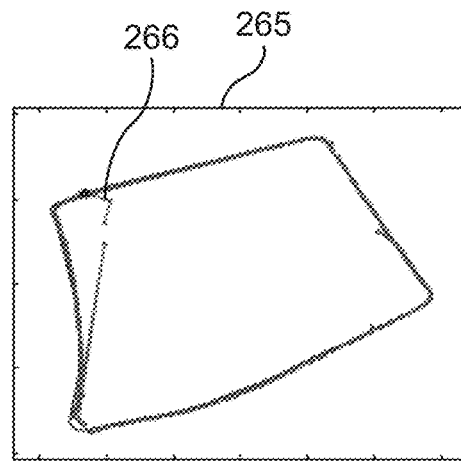

FIG. 2C illustrates camera localization results, in accordance with an embodiment. Plot 240 includes a ground truth camera trajectory (path) 242 that is 1120 meters long for an autonomous driving application. The Plot 240 also includes a trajectory of estimated camera poses 244 beginning at a first frame 241. The trajectory 244 is generated by a prior art camera localization system using stereo visual odometry and has a mean translation error of 40.20 and a mean rotation error of 12.85 degrees. Trajectory 244 drifts away from the ground truth camera trajectory 242.

Plot 245 includes the trajectory 242 overlaid with a trajectory of estimated camera poses 246 beginning at the first frame, where the trajectory 246 is generated by the camera pose estimation system 100 (trained using supervision) and has a mean translation error of 9.84 and a mean rotation error of 3.96 degrees. Plot 250 includes the trajectory 242 overlaid with a trajectory of estimated camera poses 252 beginning at the first frame, where the trajectory 252 is generated by the camera pose estimation system 125 (trained using supervision and self-supervision) and has a mean translation error of 8.17 and a mean rotation error of 2.62 degrees. As shown by plot 255, the mean translation error and a mean rotation error for the camera pose estimation system 125 may be reduced to by doubling the number of input image sequences for self-supervised training to 6.95 and 2.38 degrees, respectively. Plot 260 includes the trajectory 242 overlaid with a trajectory of estimated camera poses 262 beginning at the first frame, where the trajectory 262 is generated by the camera pose estimation system 125 (trained using supervision and self-supervision) using GPS data and the additional data input to the training loss unit 115 and has a mean translation error of 6.78 and a mean rotation error of 2.72 degrees. Plot 265 includes the trajectory 242 overlaid with a trajectory of estimated camera poses 266 beginning at the first frame, where the trajectory 266 is generated by the camera pose estimation system 200 (trained using supervision and self-supervision) and has a mean translation error of 6.73 and a mean rotation error of 2.23 degrees.

While the camera pose estimation system 100 produces a more accurate trajectory 246 compared with the trajectory 244, the use of self-supervision for the camera pose estimation system 125 further improves the accuracy. Finally, the use of PGO in the camera pose estimation system 200 produces the most accurate trajectory 266. Outlier estimated camera pose positions in the plots shown in FIG. 2C often correspond to images with large over-exposed regions, and can be filtered out with simple post-processing (e.g. temporal median filtering).

In summary, camera pose estimation systems 100, 125, and 200 learn a general, data-driven map representation for camera localization. The weights of the DNN 110 are learned to define the map representation of an environment captured by a camera. The weights may be continuously updated during inferencing with self-supervision using unlabeled data (input images, translation constraints from two GPS readings, pose constraints from visual odometry between pairs of images, rotation constraints from two IMU readings, etc). The DNN 110 is trained (supervised and self-supervised) using pairs of input images and the input images in each pair are not necessarily adjacent in a sequence. Finally, a moving-window PGO may be employed during inferencing to obtain a smooth and drift free camera trajectory by fusing the estimated camera pose predictions and visual odometry data.

Parallel Processing Architecture

Figure 3:
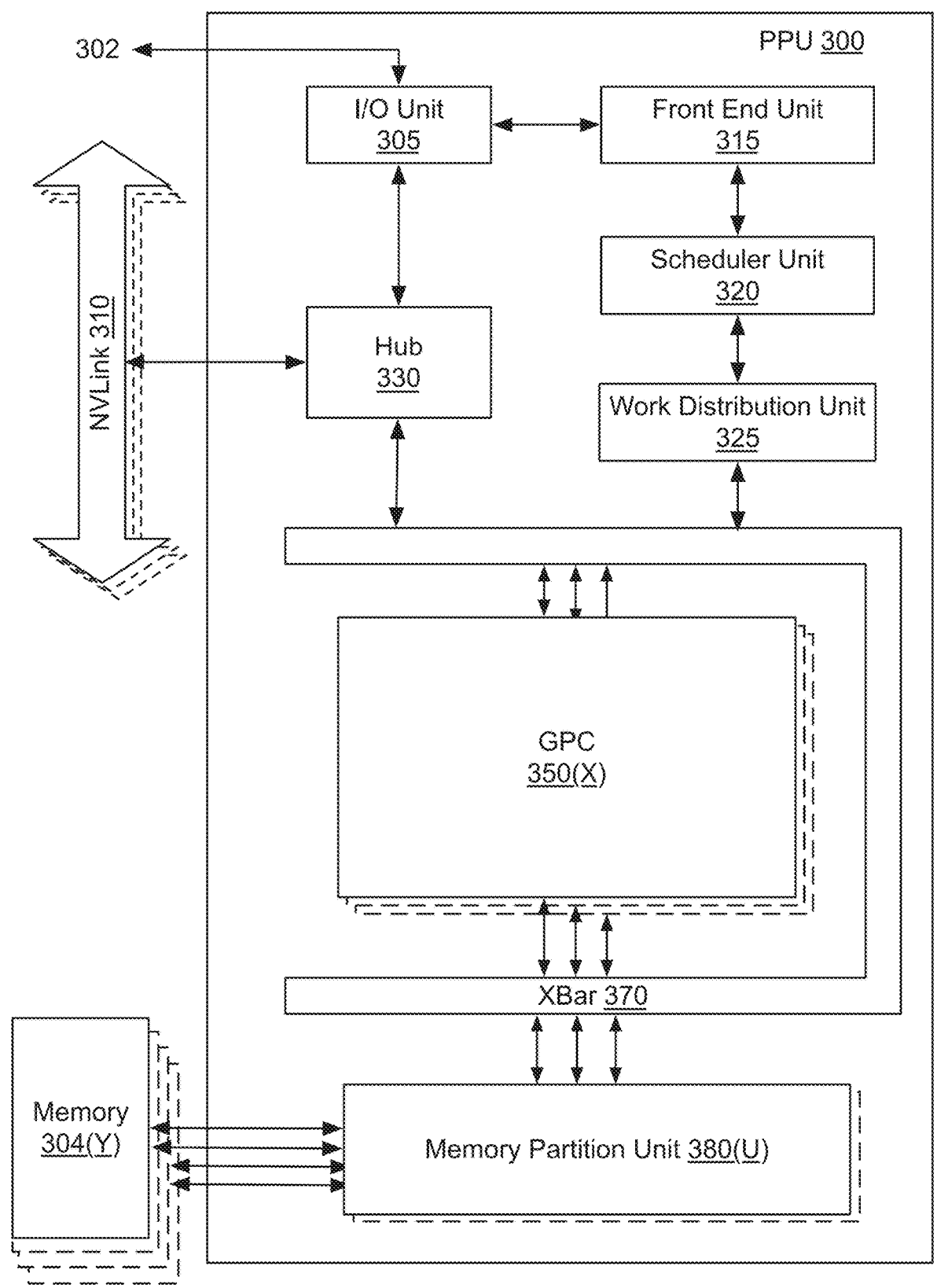
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (i.e., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (i.e., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (i.e., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. The results can be transmitted to another PPU 304 or CPU via the NVLink 310. In an embodiment, the PPU 300 includes a number U of partition units 380 that is equal to the number of separate and distinct memory devices 304 coupled to the PPU 300. A partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (i.e., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
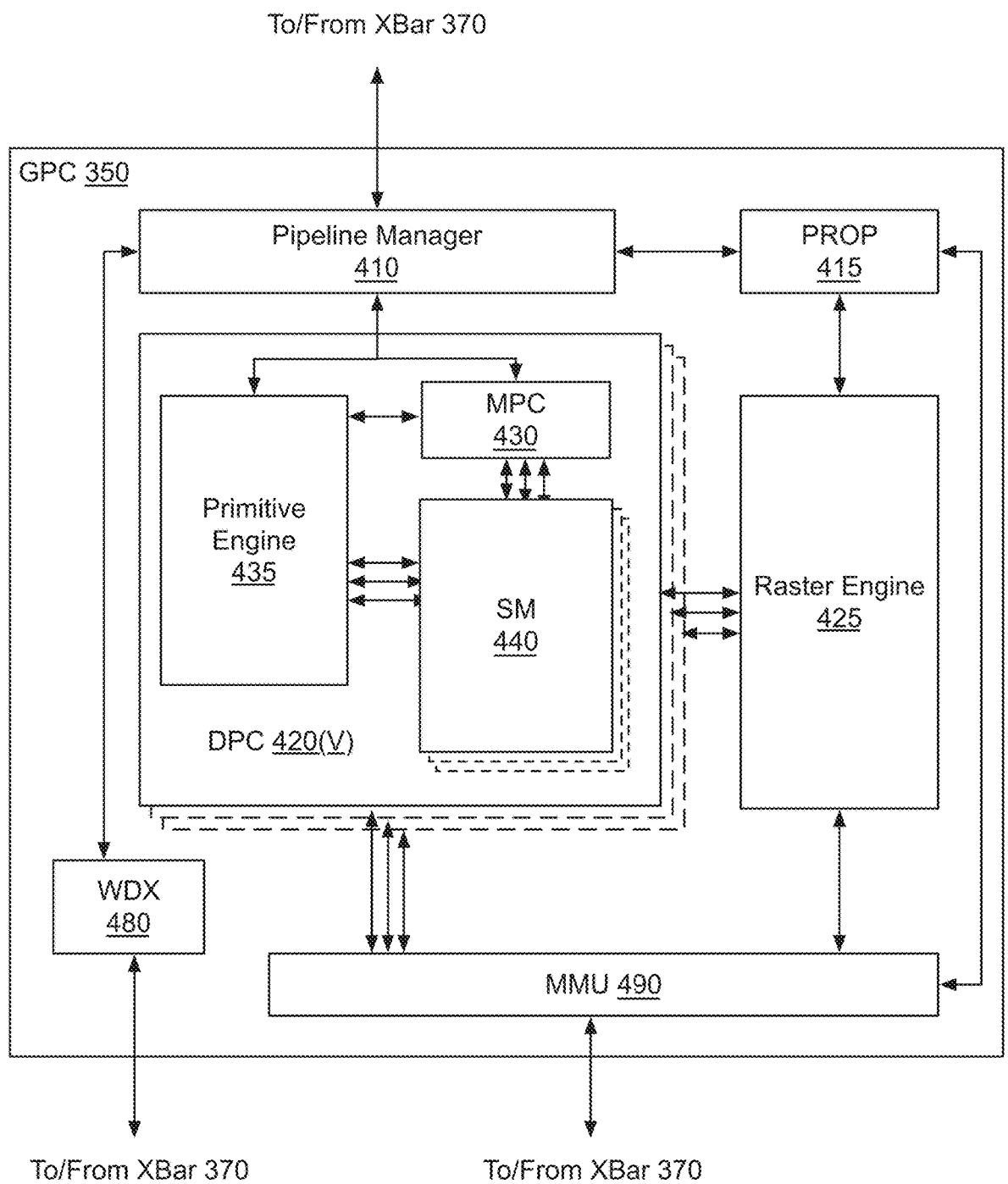
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
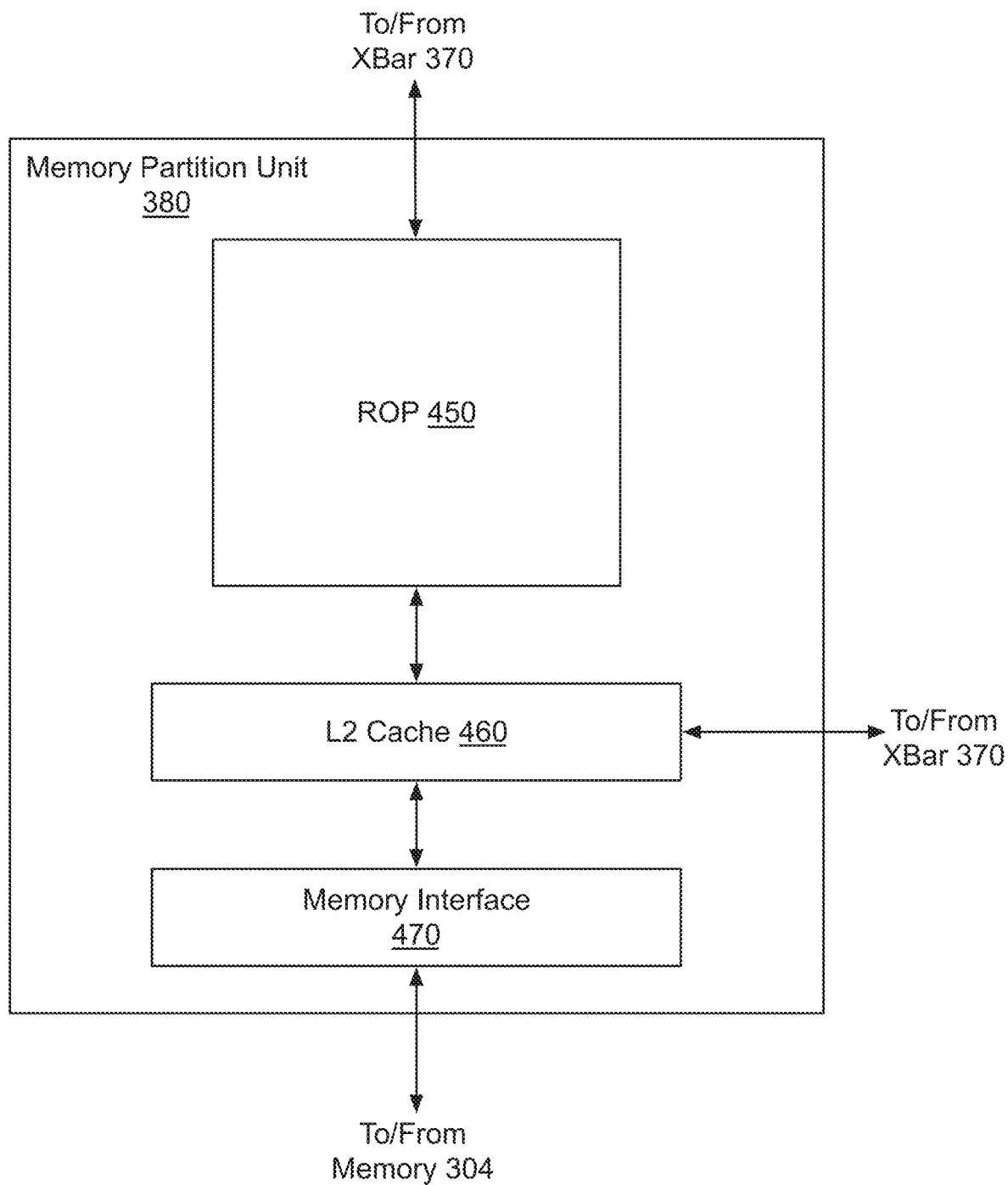
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of partition units 380, where each pair of partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (i.e., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
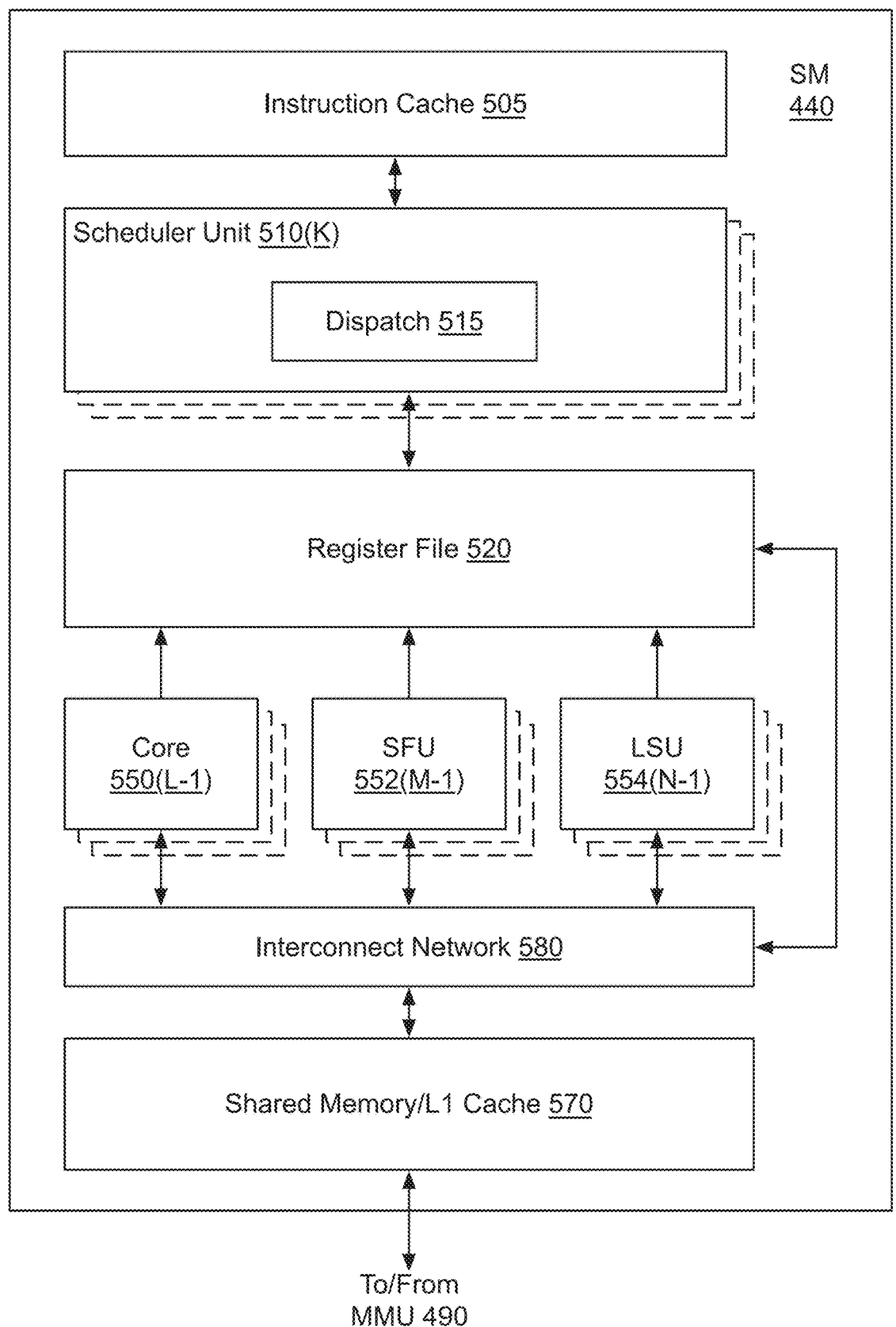
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (i.e., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (i.e., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement to fixture operations such as filtering operations using mip-maps (i.e., texture maps of varying levels of detail). In an embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 204, a reduced instruction set computer (RISC) CPU, a memory management unit (MMU), a digital-to-analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
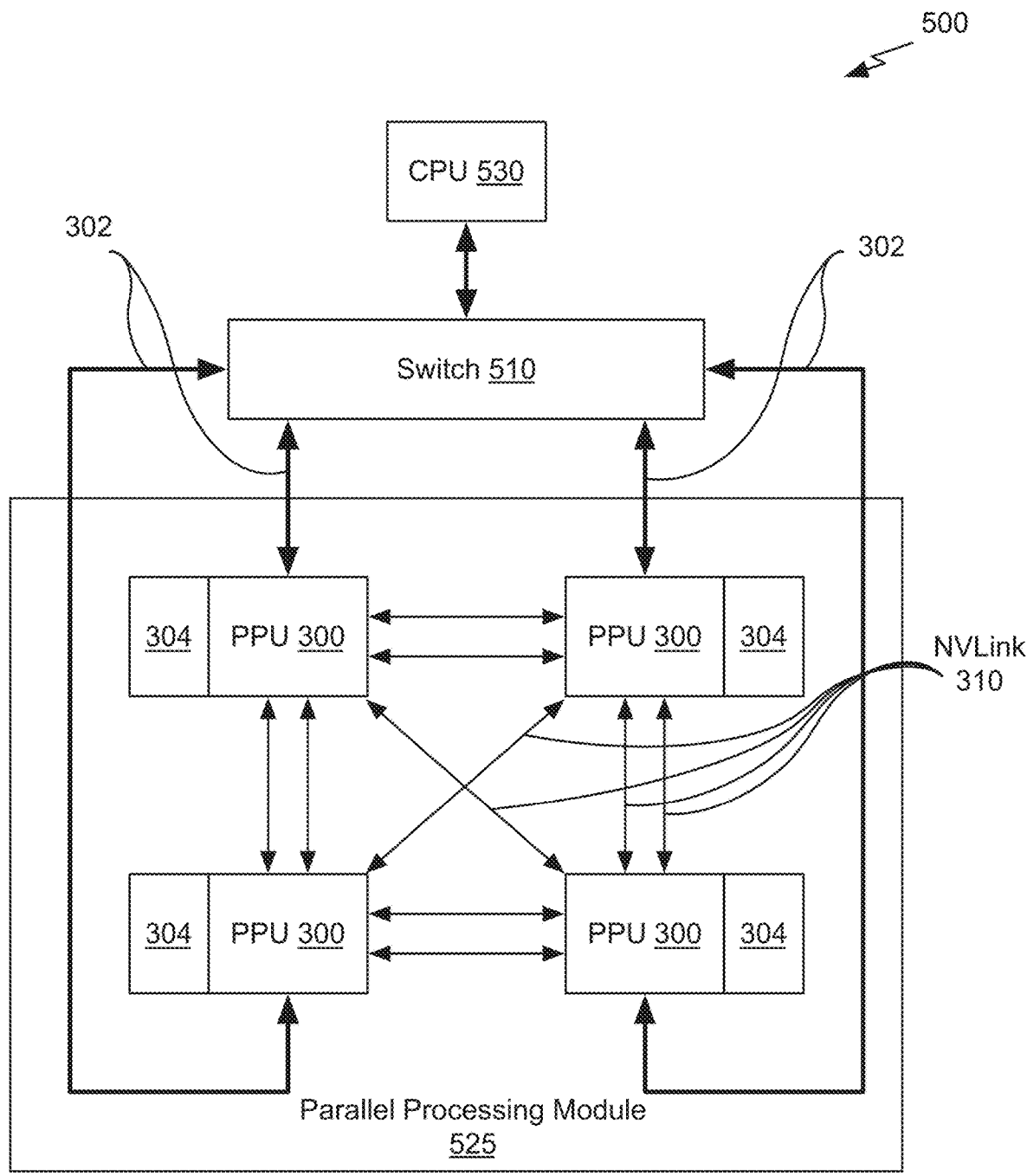
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The exemplary system 565 may be configured to implement the method 130 shown in FIG. 1C, the method 150 shown in FIG. 1E, and/or the method 220 shown in FIG. 2B. The processing system 500 includes a CPU 530, switch 510, and multiple PPUs 300 each and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
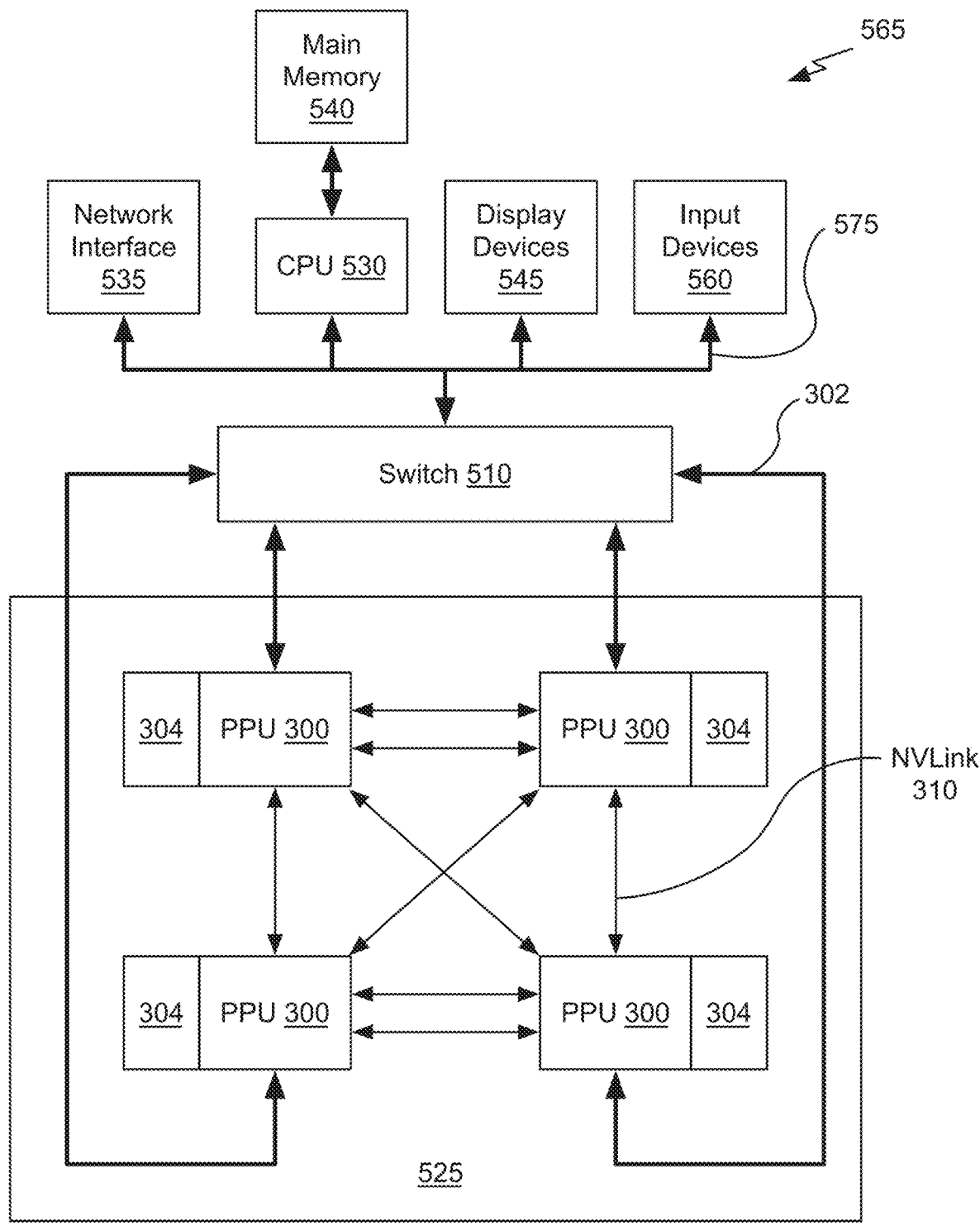
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the method 130 shown in FIG. 1C, the method 150 shown in FIG. 1E, and/or the method 220 shown in FIG. 2B.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, i.e. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected perceptrons (e.g., nodes) that can be trained with enormous amounts of input data to quickly solve complex problems with high accuracy. In one example, a first layer of the DLL model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

What is claimed is:

1. A computer-implemented method, comprising:
receiving image pairs at a deep neural network, DNN, wherein a relative camera pose is associated with each image pair of the image pairs;
applying, by the DNN, weights that define a map representation of an environment to the image pairs to generate estimated camera pose pairs, wherein each estimated camera pose pair generated by the DNN for each image pair is the estimated camera pose pair for capturing the environment to produce the image pair;
computing first differences, wherein each first difference of the first differences is computed between a camera pose for at least one image of each image pair and the estimated camera pose pair generated by the DNN for the image pair;
computing, for each image pair, a relative estimated camera pose based on the estimated camera pose pairs;
computing second differences, wherein each second difference of the second differences is computed between the relative camera pose associated with each image pair and the relative estimated camera pose computed for the image pair; and
updating the weights based on the first differences and the second differences.

2. The computer-implemented method of claim 1, further comprising, for each image pair, computing a second camera pose for a remaining image of the image pair using the relative camera pose and the camera pose for the at least one image, wherein the camera pose for the at least one image and the second camera pose comprise a pair of camera poses.

3. The computer-implemented method of claim 1, wherein each one of the image pairs includes a first image and an additional image in an image sequence, and one or more intervening images may occur between the first image and the additional image.

4. The computer-implemented method of claim 1, wherein the weights are updated to simultaneously reduce the first differences and the second differences.

5. The computer-implemented method of claim 1, wherein a rotation portion of the estimated camera pose pairs is parameterized as a three-dimensional logarithm of a unit quaternion.

6. The computer-implemented method of claim 1, further comprising receiving visual odometry data corresponding to the image pairs, wherein the weights are updated to minimize differences between the visual odometry data and the relative estimated camera pose.

7. The computer-implemented method of claim 1, further comprising receiving global position sensor data corresponding to the image pairs, wherein the weights are updated to minimize differences between the global position sensor data and the estimated camera pose pairs.

8. The computer-implemented method of claim 1, further comprising receiving inertial measurement data corresponding to the image pairs, wherein the weights are updated to minimize differences between the inertial measurement data and the estimated camera pose pairs.

9. The computer-implemented method of claim 1, further comprising post-processing the estimated camera pose pairs using pose graph optimization, PGO, to produce refined camera pose pairs.

10. The computer-implemented method of claim 1, wherein the DNN comprises at least a convolutional neural network layer, followed by a global average pooling layer, followed by a fully-connected layer to output the estimated camera pose pairs.

11. A system, comprising:
a deep neural network, DNN, configured to:
receive image pairs, wherein a relative camera pose is associated with each one of the image pairs;
apply weights that define a map representation of an environment to each one of the image pairs to generate estimated camera pose pairs, wherein each estimated camera pose pair generated by the DNN for each image pair is the estimated camera pose pair for capturing the environment to produce the image pair;
compute first differences, wherein each first difference of the first differences is computed between a camera pose for at least one image of each image pair and the estimated camera pose pair generated by the DNN for the image pair;
compute, for each image pair, a relative estimated camera pose based on the estimated camera pose pairs;
compute second differences, wherein each second difference of the second differences is computed between the relative camera pose associated with each image pair and the relative estimated camera pose computed for the image pair; and
update the weights based on the first differences and the second differences.

12. The system of claim 11, wherein, for each image pair, a second camera pose is computed for a remaining image of the image pair using the relative camera pose and the camera pose for the at least one image.

13. The system of claim 11, wherein each one of the image pairs includes a first image and an additional image in an image sequence, and one or more intervening images may occur between the first image and the additional image.

14. The system of claim 11, wherein the weights are updated to simultaneously reduce the first differences and the second differences.

15. The system of claim 11, wherein a rotation portion of the estimated camera pose pairs is parameterized as a three-dimensional logarithm of a unit quaternion.

16. The system of claim 11, wherein the system is further configured to receive visual odometry data corresponding to the image pairs, wherein the weights are updated to minimize differences between the visual odometry data and the relative camera pose.

17. The system of claim 11, wherein the system is further configured to post-process the estimated camera pose pairs using pose graph optimization, PGO, to produce a refined camera pose pairs.

18. A non-transitory computer-readable media storing computer instructions that, when executed by one or more processors, cause the one or more processors to perform the steps of:
receiving image pairs at a deep neural network, DNN, wherein a relative camera pose is associated with each image pair of the image pairs;
applying, by the DNN, weights that define a map representation of an environment to the image pairs to generate estimated camera pose pairs, wherein each estimated camera pose pair generated by the DNN for each image pair is the estimated camera pose pair for capturing the environment to produce the image pair;

computing first differences, wherein each first difference of the first differences is computed between a camera pose for at least one image of each image pair and the estimated camera pose pair generated by the DNN for the image pair;

computing, for each image pair, a relative estimated camera pose based on the estimated camera pose pairs;

computing second differences, wherein each second difference of the second differences is computed between the relative camera pose associated with each image pair and the relative estimated camera pose computed for the image pair; and updating the weights based on the first differences and the second differences.

* * * * *